US008291107B1

(12) United States Patent
Upadhyay et al.

(10) Patent No.: US 8,291,107 B1
(45) Date of Patent: Oct. 16, 2012

(54) DYNAMIC MULTIMEDIA CONTENT CHANGE BASED ON SECTOR LOADING

(75) Inventors: Piyush Upadhyay, Overland Park, KS (US); Badri Subramanyan, Overland Park, KS (US); John Davis, Kansas City, MO (US); Raghava Nidraghatta Karanam, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 211 days.

(21) Appl. No.: 12/480,180

(22) Filed: Jun. 8, 2009

(51) Int. Cl.
G06F 15/16 (2006.01)

(52) U.S. Cl. ........ 709/234; 709/217; 709/224; 709/225; 709/231; 709/232; 709/235

(58) Field of Classification Search .................. 709/217, 709/224–225, 231–235
See application file for complete search history.

(56) References Cited

U.S. PATENT DOCUMENTS

| 6,205,140 | B1 | | 3/2001 | Putzolu et al. |
| 6,359,902 | B1 | | 3/2002 | Putzolu |
| 6,449,638 | B1 | | 9/2002 | Wecker et al. |
| 6,548,747 | B2 | | 4/2003 | Shibata et al. |
| 6,564,263 | B1 | | 5/2003 | Bergman et al. |
| 6,587,837 | B1 | | 7/2003 | Spagna et al. |
| 7,027,415 | B1 | * | 4/2006 | Dahlby et al. ................ 370/322 |
| 7,184,767 | B2 | * | 2/2007 | Gandolfo ................... 455/435.2 |
| 7,313,112 | B2 | * | 12/2007 | Rajkotia ....................... 370/331 |
| 7,502,834 | B2 | * | 3/2009 | Ehrich et al. .................. 709/217 |
| 7,525,940 | B2 | * | 4/2009 | Trossen et al. ................ 370/331 |
| 7,571,246 | B2 | * | 8/2009 | Virdi et al. .................... 709/232 |
| 7,760,740 | B2 | * | 7/2010 | Broberg .................... 370/395.5 |
| 7,864,727 | B2 | * | 1/2011 | Inayoshi et al. .............. 370/329 |
| 7,958,242 | B2 | * | 6/2011 | Rey .............................. 709/227 |
| 2005/0132264 | A1 | * | 6/2005 | Joshi et al. .................. 715/500.1 |
| 2008/0227484 | A1 | * | 9/2008 | Auvray et al. ............. 455/552.1 |

OTHER PUBLICATIONS

Handley, M. et al., SDP: Session Description Protocol, Network Working Group Request for Comments: 2327, Category: Standards Track, Apr. 1998, available at http://www.ietf.org/rfc/rfc2327.txt (last visited Aug. 23, 2011).

* cited by examiner

*Primary Examiner* — Kamal Divecha

(57) ABSTRACT

Disclosed herein are methods and systems using a Media Channel Descriptor (MCD) file to manage media streams in a coverage area of a wireless access network. For example, an exemplary method involves (a) receiving a request for a media stream in the first format (that was specified by the MCD file), wherein the request is received from an access terminal that is operating in a coverage area of a wireless access network; (b) in response to the request, initiating a media stream in the first format, to the access terminal; (c) making a determination as to whether or not, with the media steam in the first format, traffic in the coverage area has reached a threshold level; and (d) in response to the determination that the traffic in the coverage area has reached the threshold level, modifying the MCD file to indicate a second format for new media streams.

16 Claims, 4 Drawing Sheets

US 8,291,107 B1

DYNAMIC MULTIMEDIA CONTENT CHANGE BASED ON SECTOR LOADING

BACKGROUND

Wireless devices such as personal digital assistants, cellular telephones, and the like can provide a platform for playing digital media content, such as music, news, sports reports, and other types of media. The media may be audio, visual, or both audio plus visual data. The media content is streamed from a server on a computer network (such as the Internet) over an air interface to the wireless device using known wireless technology. The wireless device includes buttons or other user interface devices that the user uses to select the media content they wish to experience. A streaming media application, referred to herein interchangeably as a media client application, plays the content as well as provides an interface to a media distribution application resident on the network.

Wireless devices (also referred to as wireless access terminals) may engage in packet-data communications via a wireless access network that provides access to the Internet or other packet-switched networks. As such, an access terminal may wirelessly engage in a streaming media session by connecting in a coverage area or sector of a wireless access network, requesting media content stored on a content server, and receiving a real-time data stream of the media content via the access network and packet-switched network. Typically a gateway assists the user of an access terminal with the selection of media content to be streamed. In particular, the user may be provided with a media content descriptor (MCD) file, which has direct link to the media content stored on the content server. Thus, when the user clicks on the link displayed in a streaming player application, the access terminal requests the content from the content server.

The underlying technology for streaming media content to a wireless device is known in the art. Reference is made to U.S. Pat. Nos. 6,587,837; 6,564,263; 6,449,638 and 6,548,747 for background description of streaming media content technology. The content of these patents is incorporated by reference herein. Media session announcement, session invitation and session initiation for wireless devices over inter-networks is typically performed in accordance with the Session Description Protocol, which is described in the IETF Request for Comments 2327, M. Handley et al., dated April 1998, the contents of which are incorporated by reference herein. Media session coordination and initiation is also described in U.S. Pat. Nos. 6,205,140 and 6,359,902, the contents of which are incorporated by reference herein.

OVERVIEW

Since a sector in a cellular or wireless access network has limited capacity to serve users, a sector may become clogged when multiple users access streaming media content concurrently. When the capacity of a sector is reached, additional users attempting to access streaming content are typically blocked, which may result in user dissatisfaction and confusion. Accordingly, to help provide for more concurrent streaming media sessions in a given sector, systems and methods are disclosed that involve dynamically updating the format or formats in which streaming media content is available, preferably by updating the format or formats specified by a Media Channel Descriptor (MCD) file. In an exemplary embodiment, a gateway or other network entity may dynamically update the MCD file, depending upon the traffic level in a sector. In a further aspect of the exemplary embodiment, the gateway may use sector-identification data provided by access terminals to monitor the traffic level in a given sector, and dynamically update the MCD file according to the traffic level.

In one aspect, a method for using an MCD file to manage available media content is disclosed. The MCD file comprises an indication of a format in which new media streams are available, and initially indicates a first format for new media streams. The method comprises (a) receiving one or more requests for a media stream, wherein each request for a media stream is received from an access terminal that is operating in a sector of a wireless access network; and (b) upon receipt of each request for a media stream: (i) making a determination as to whether or not, with initiation of the requested media steam to the access terminal, traffic in the sector in which the requesting access terminal is operating has reached a threshold level; (ii) if the determination is that the traffic has reached the threshold level, modifying the MCD file to indicate a second format for new media streams; and (iii) if the determination is that the traffic has not reached the threshold level, refraining from modifying the MCD file.

The method may further involve (c) receiving sector-identification data from each requesting access terminal, wherein the sector-identification data identifies the sector in which the requesting access terminal is operating and (d) using the sector-identification data as a basis for making the determination as to whether or not, with the initiation of the requested media steam to the access terminal, traffic in the sector in which the requesting access terminal is operating has reached a threshold level. A record of each request for a media stream may then be stored in a traffic database, wherein the record comprises an indication that a media stream is open or is about to be opened in the sector in which the requesting access terminal is operating.

In a further aspect, a system configured to use an MCD file to manage available media content is disclosed. The MCD file indicates a format in which new media streams are available, and wherein the MCD file initially indicates a first format for new media streams. The system comprises (i) a communication interface configured to receive one or more requests for a media stream, wherein each request for a media stream is received from an access terminal that is operating in a sector of a wireless access network; (ii) a processor; and (iii) program logic stored in data storage and executable by the processor to, upon receipt of each request for a media stream: (a) make a determination as to whether or not, with initiation of the requested media steam to the access terminal, traffic in the sector in which the requesting access terminal is operating has reached a threshold level; (b) if the determination is that the traffic has reached the threshold level, then modify the MCD file to indicate a second format for new media streams; and (c) if the determination is that the traffic has not reached the threshold level, then refrain from modifying the MCD file.

The communication interface may be further configured to receive sector-identification data from each requesting access terminal, wherein the sector-identification data identifies the sector in which the requesting access terminal is operating. Further, the program logic stored in the data storage may be further executable to use the sector-identification data as a basis for the determination as to whether or not, with the initiation of the requested media steam to the access terminal, traffic in the sector in which the requesting access terminal is operating has reached the threshold level.

In an additional aspect, an access terminal is disclosed. The access terminal comprises (i) a communication interface configured to engage in packet-data communications via a wireless access network; (ii) a processor; and (iii) program logic stored in data storage and executable by the processor to, while located in a coverage area of the wireless access network: (a) receive a Media Channel Descriptor (MCD) file, wherein the MCD file indicates at least a first format in which a media stream is available from a server; (b) send a request for the media stream to the server via the wireless access network; (c) send sector-identification data to the server, wherein the sector-identification data identifies the sector in which the access terminal is operating, wherein the server is configured to use the sector-identification data to determine traffic level in the sector in which the access terminal is operating relative to a threshold level, and to responsively modify the MCD file according to the relative traffic level in the sector; and (d) receive the media stream from the server.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Figure 1:
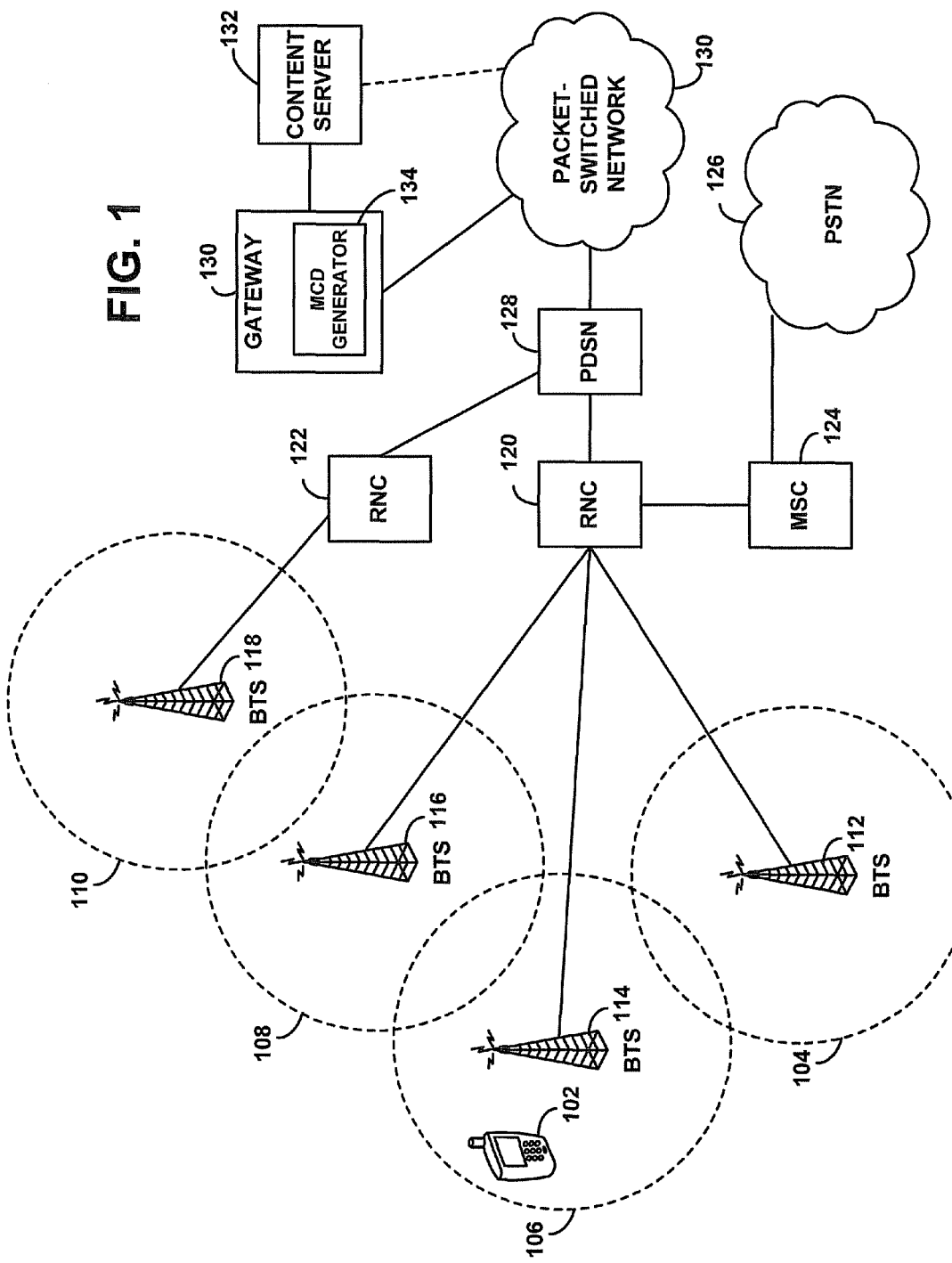
FIG. 1 is a block diagram of an access network configured to provide wireless service to wireless access terminals, according to an exemplary embodiment.

FIG. 1 is a block diagram of an access network configured to provide wireless service to wireless access terminals. As shown, an access network may include a plurality of base stations 112-118. Each base station 112-118 of the access network may function to transmit RF-radiation patterns at one or more carrier frequencies. The RF-radiation patterns may then provide one or more air interfaces over which the access terminal 102 may communicate with the access network. For example, each base station 112-118 may transmit omni-directional RF-radiation patterns that provide a single air interface. Alternatively, each base station 112-118 may transmit directional RF-radiation patterns that provide multiple air interfaces.

Each base station 112-118 may serve a corresponding wireless coverage area 104-110, respectively. If a base station, such as base station 112, provides a single air interface, then the base station may serve a single wireless coverage area 104 (e.g., a cell). Alternatively, if a base station provides multiple air interfaces, the base station may serve multiple wireless coverage areas (e.g., sectors). (Note that if a base station serves a single coverage area, the coverage area is generally referred to as a cell but may also be referred to as a sector.) In either case, each of the one or more air interfaces and their corresponding wireless coverage areas may be defined by the one or more carrier frequencies of their respective serving base station 112-118 and/or a pseudo-random number (PN) offset that distinguishes one wireless coverage area of the a given base station from another.

Each base station tower is typically connected with a radio network controller (RNC) (also known as a base station controller (BSC)). In the access network, base stations 112-116 are connected to RNC 120, and base station 118 is connected to RNC 122. Each RNC may function to communicate with and control aspects of the base stations it serves, as well as aspects of air-interface communications with the access terminal 102. Each RNC, such as RNC 120 or RNC 122, may then be coupled to a switch or gateway, such as a mobile switching center (MSC) 124, which may provide connectivity with public-switched telephone network (PSTN) 126. Further, RNC 120 may also be coupled to a switch or gateway, such as a packet-data serving node (PDSN) 128, which may provide connectivity with a packet-switched network 130, such as the Internet. In this respect, RNC 120 may additionally include a packet control function ("PCF") for controlling packet-data communications. With this general arrangement, the access network may facilitate communications between access terminals operating in the access network's coverage areas and PSTN 128 and/or the packet-switched network 130.

The network may communicate with access terminal 102 according to any of a variety of air-interface protocols. For example, the air-interface communications may be carried out according to CDMA (e.g., 1xRTT, EV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed.

Sitting as nodes on packet-switched network 126 are a gateway 130 and a content server 132. The gateway 130 and content server 132 may communicate with each other via packet-switched network 126 or via a private connection between the two. More generally, the communication path between gateway 130 and content server 132 may be a direct or an indirect connection (e.g., a single-hop connection, or multi-hop connection with other entities in the communication path between the two). Further, the communication path may be implemented using wired and/or wireless connections.

Content server 132 may include or have access to a database storing media content. Furthermore, content server 132 may be configured so that access to the content server 132 is limited (as indicated by the dotted-line connecting packet-switched network 130 and content server 132). Accordingly, gateway 130 may be configured to act as a proxy, handling requests for media content on behalf of the content server 132. It is also contemplated that, in the alternative, an access terminal may access a content server directly. Therefore, a content server may be configured to provide some or all of the functionality that is attributed to the gateway herein.

In an exemplary embodiment, content server 132 takes the form of a streaming media server, storing media content that can be streamed in real-time. As such, gateway 130 may receive requests to stream content stored on content server 132 to access terminals. Further, media content may be sent from the streaming media server to gateway 130, where it is streamed or otherwise transmitted to an access terminal via the packet-switched network 126 and the wireless access network. In an alternative embodiment, the gateway may handle requests on behalf of the content server, while the content server itself streams the media. The content server 132 and/or gateway 130 may use RTSP/RTP/RTCP protocols to stream media content to an access terminal. These protocols are well known in the art, and thus are not set forth in detail herein.

As noted, an access terminal may send a request for a media stream (i.e., a stream of media content), to gateway 130. To facilitate such requests, Media Channel Descriptor (MCD) protocol may be employed. In an exemplary embodiment, the gateway 130 may include an MCD generator 134, which is configured to send an MCD file to an access terminal. In an alternative embodiment, a gateway may be configured to communicate with an MCD generator that is implemented as a separate network entity from the gateway. Referring again to the exemplary embodiment, gateway 130 may be configured to modify various attributes of the MCD file that the MCD generator 134 creates. Accordingly, an access terminal may include a multimedia client application (e.g., software) that processes an MCD file and may display the available channel information, as well as video content, on the display of the access terminal. (The access terminal may further include speakers for presentation of audio content.)

More specifically, an MCD file may include media content descriptions, subscribed and available channel data, and other information that may allows an access terminal to request and receive media content in various formats. Among other things, an MCD file may provide a list available channels (for various media content) and Universal Resource Locator (URL) addresses where the available channels may be accessed. An MCD file may take various forms, but in an exemplary embodiment, takes the form of an Extensible Markup Language (XML) document, which employs an XML file format where the MIME Type is "application/x-pcs-MCD file +xml." This XML file may be identified with a ".MCD" file extension. Other formats for the MCD file are also possible.

Figure 2:
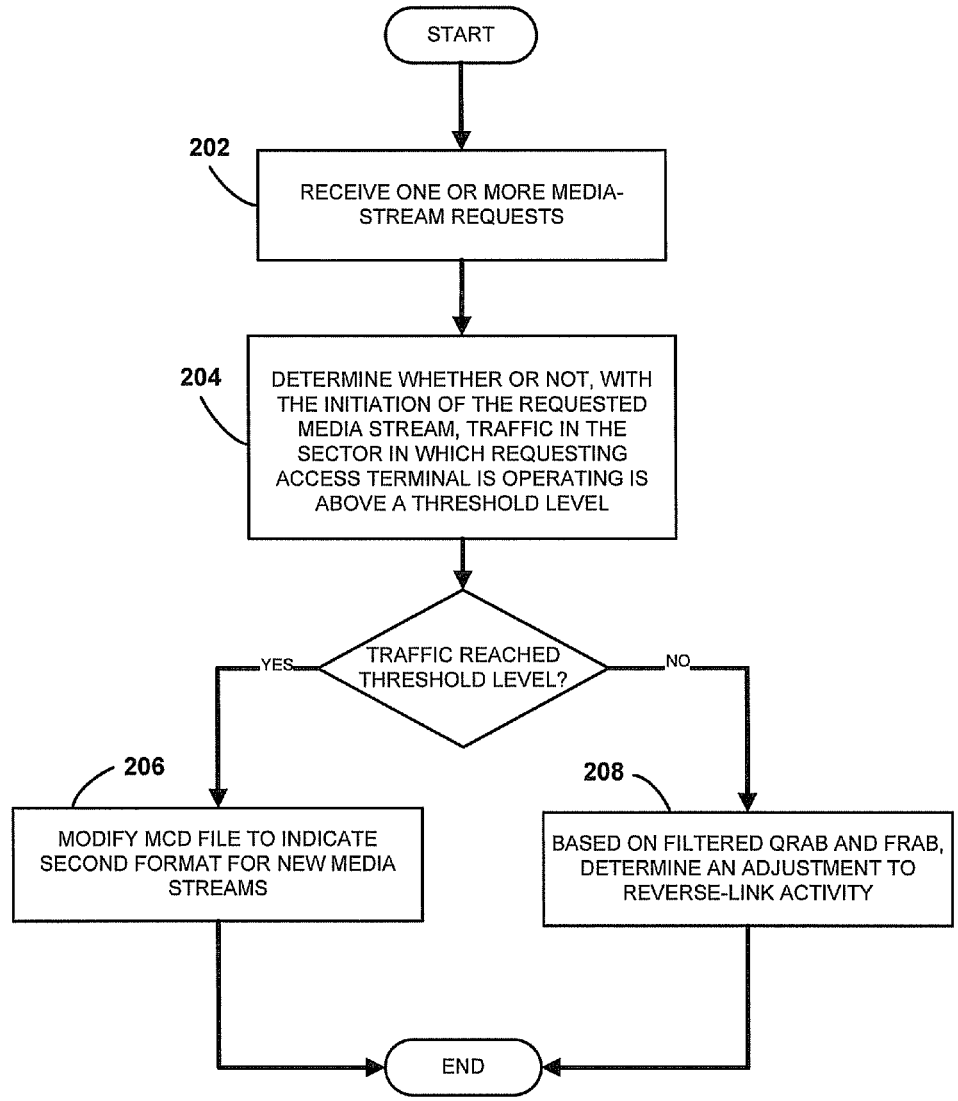
FIG. 2 is a flow chart illustrating a method for using a Media Channel Descriptor (MCD) to manage media streams in a coverage area, according to an exemplary embodiment.

FIG. 2 is a flow chart illustrating a method for using an MCD file to manage available media content (i.e. media content available from a content server), according to an exemplary embodiment. The method is described by way of example, as being performed by a gateway, which provides access to media content stored on a separate content server. However, those skilled in the art will recognize that the method may be carried out by a combination gateway/content server, by a content server providing direct access to media, or may be carried out by another entity or entities altogether.

The MCD file may include various types of information describing media content, and in particular, may indicate a format in which new media streams are available. According to an exemplary method, the MCD file initially indicates a first format for new media streams. Thus, the MCD file informs an access terminal receiving the file that media content is available in the first format. Accordingly, the access terminal may request a media stream (e.g., request that the media content be streamed to the access terminal) in the first format.

As shown in block 202, the method involves the gateway receiving one or more media-stream requests. Each request is received from an access terminal that is operating in a sector of a wireless access network. Upon the receipt of each request, the gateway makes a determination as to whether or not, with the initiation of the requested media steam, traffic is above a threshold level in the sector in which the requesting access terminal is operating, as shown in block 204. If the traffic has reached the threshold level, then the gateway modifies the MCD file to indicate a second format for new media streams, as shown by block 206. If, on the other hand, the traffic level is below the threshold level, then the gateway refrains from modifying the MCD file, as shown by block 208.

It should be understood that it is a matter of engineering design choice as to whether a traffic level that is equal to the threshold level is treated as being above or below the threshold level. For purposes of simplicity, in the embodiments described herein, the term "above" is assumed to mean "greater than or equal to." However, it is within the scope of the invention that a traffic level that is equal to the threshold level may be treated as being below the threshold level, or treated in a different manner entirely.

The gateway may receive requests for a media stream from a number of different access terminals. It is also possible that multiple requests may be received from a single access terminal. Each access terminal has an associated sector in which it is operating; in other words, the sector in which it is connected to the wireless access network. Furthermore, each request may be for the same or different media content, which may be stored on the same or a different content server.

In practice, the first and second formats may take on various forms. For instance, the first format and may be an audio-visual format (such as MPEG2, AVI, WMV, Flash, etc.), an audio-only format (such as MP3, WAV, M4P, etc.), or a video-only format (e.g., video codec formats such as H263 and H264). In addition to the aforementioned file types, the first and second formats may be further defined by the attributes of the media content. In other words, MPEG2 content having a resolution of 640×480 may be considered to be of a different format than MPEG2 content having a resolution of 1024× 768, for instance. In an exemplary method, the second format is typically of lesser quality and/or consumes less network resources than the first format, although it is possible for the second format to be of higher quality than the first, without departing from the scope of the invention.

In an exemplary embodiment, a determination that the traffic in a coverage area is above a threshold level may be based, at least in part, upon sector-identification data provided by access terminals requesting media streams. In particular, when an access terminal requests media content from the gateway, the access terminal may also send sector-identification data that identifies the sector in which the requesting access terminal is operating (such as a base station ID and/or a sector ID). Sector-identification data may be included as part of each request, or alternatively, may be sent separately, at substantially the same time as a media-stream request (e.g., either concurrently, just before, or just after the request).

In an alternative embodiment, the gateway itself may itself determine the sector in which the access terminal is operating. For instance, the gateway may query a position-determining system (PDS) of the wireless access to determine the geographic location of the device, and use the location to determine its sector. Other examples are also possible. The gateway may then use the sector-identification data as a basis to determine whether or not, with the initiation of the requested media steam, traffic in the sector in which the requesting access terminal is operating is above the threshold level.

In a further aspect, the gateway may store a record of each request for a media stream in a traffic database. The record may include an indication that a media stream is open or is about to be opened in the sector in which the requesting access terminal is operating. For example, each record may include a sector ID for the sector in which the requesting access terminal is operating and a parameter indicating whether the media stream is open or has been closed (which is preferably set to be open once the media stream to the access terminal is initiated). Each record may also include a user ID identifying the requesting access terminal and/or a unique ID for the media stream itself, as well as other data associated with the media stream.

Provided with the traffic database, the determination as to whether or not traffic in a sector has reached the threshold level may involve querying the traffic database to determine the number of open media streams in the sector in which the requesting access terminal is operating. According to an exemplary embodiment, the gateway queries the traffic database after receiving and storing the record of each media-stream request, determines whether or not the number of open media streams in the sector in which the requesting access terminal is operating is above the threshold number of media streams, and then modifies the MCD file as appropriate.

In a further aspect, the gateway may determine, or receive notification, when a media stream is closed. For instance, the gateway may monitor open media streams that it handles for its associated content server or servers, and detect when the streams are closed. As another example, the gateway may receive a notification from a content server or from an access terminal when a stream is closed. And as an additional example, the gateway may determine or receive an indication of a specific time when a stream will be closed (such as the time a live broadcast is scheduled to end, for instance). Other examples are also possible.

When a media stream is closed, the gateway may update the traffic database to reflect that a media stream has been closed. For example, the gateway may remove or delete the record that was stored when the media stream was requested and/or opened. Alternatively, the gateway may maintain the record of the media stream, but modify the record to indicate that the stream has been closed.

Furthermore, when the gateway updates the traffic database to reflect the closing of a media stream, it may determine the resulting number of open media streams in the sector in which the media stream was closed (i.e., the sector in which an access terminal requested the now-closed media stream). Based on the resulting number of open media streams, the gateway may determine the MCD file should be modified to indicate a different file format for subsequent new media streams. For example, if the MCD file currently indicates new data streams are available in a first format and the number of open media streams in the sector is above the threshold number, then the gateway modifies the MCD file to indicate that new data streams are available in the second format. On the hand, if the MCD file currently indicates new data streams are available in the second format, and the number of open media streams is less than the threshold number, then the gateway modifies the MCD file to indicate the first format for new data streams.

It should be understood that a modification of the MCD file to indicate a different format for new media streams does not typically affect existing media streams. For instance, if an access terminal requests and is provided with an audiovisual stream, and later, while the audiovisual stream is open, the MCD file is updated to indicate that new streams are only available in audio-only format, the gateway and/or content server will typically continue providing the audiovisual stream as it otherwise would—it is typically the subsequent media streams that are limited to the audio-only format.

The threshold level for traffic in a coverage area may be set according to engineering design choice. As a specific example, in a given coverage area, bandwidth may be available to support up to six streaming sessions in an audiovisual format (i.e., a first format) and up to twenty streaming sessions in an audio-only format (i.e., a second format). Accordingly, the threshold level may be set at three open media streams. Further, threshold level may be specific to particular type of media stream (and as such, information identifying the type of media stream may also be stored in the record associated with the media stream). For instance, in the previous example, the threshold level might be set at three open audiovisual media streams, which provides for three audiovisual streams and ten audio-only streams. Accordingly, in the scenario where four audio-only streams and two audiovisual streams are open in the sector, the gateway will allow for one additional audiovisual stream, before modifying the MCD file, even though six streams are open in total.

As noted, it is possible that at a later time, after the MCD file has been modified to indicate the second format, one or more streams in a sector may close (e.g., end or cease for some other reason, such as a bad connection), which may cause the traffic in the sector to drop below the threshold level once again. Referring again to the example threshold of three open media streams, the gateway may detect that a number of streams have closed, and that only one active stream remains in the sector. In response, the gateway may modify the MCD file to again indicate that new media streams are available in audiovisual format.

It should be understood that an MCD file may at times indicate multiple formats in which new media streams are available. Thus, it is possible that at certain times media streams may be available in both the first and second format concurrently. For example, the MCD file may initially indicate streams are available in both audiovisual and audio-only formats. Then, once traffic in a sector reaches a threshold level, the MCD file is modified to indicate that new media streams are only available in audio-only format. Accordingly, when both the first format and second format are initially available (and the MCD file thus indicates both file formats are available), the step of modifying the MCD file to indicate a second format for new media streams, as shown by block 206, may simply involve removing the first format from the MCD file, and leaving the second format intact (rather than replacing the first format with the second format in the MCD file, as described above).

Figure 3:
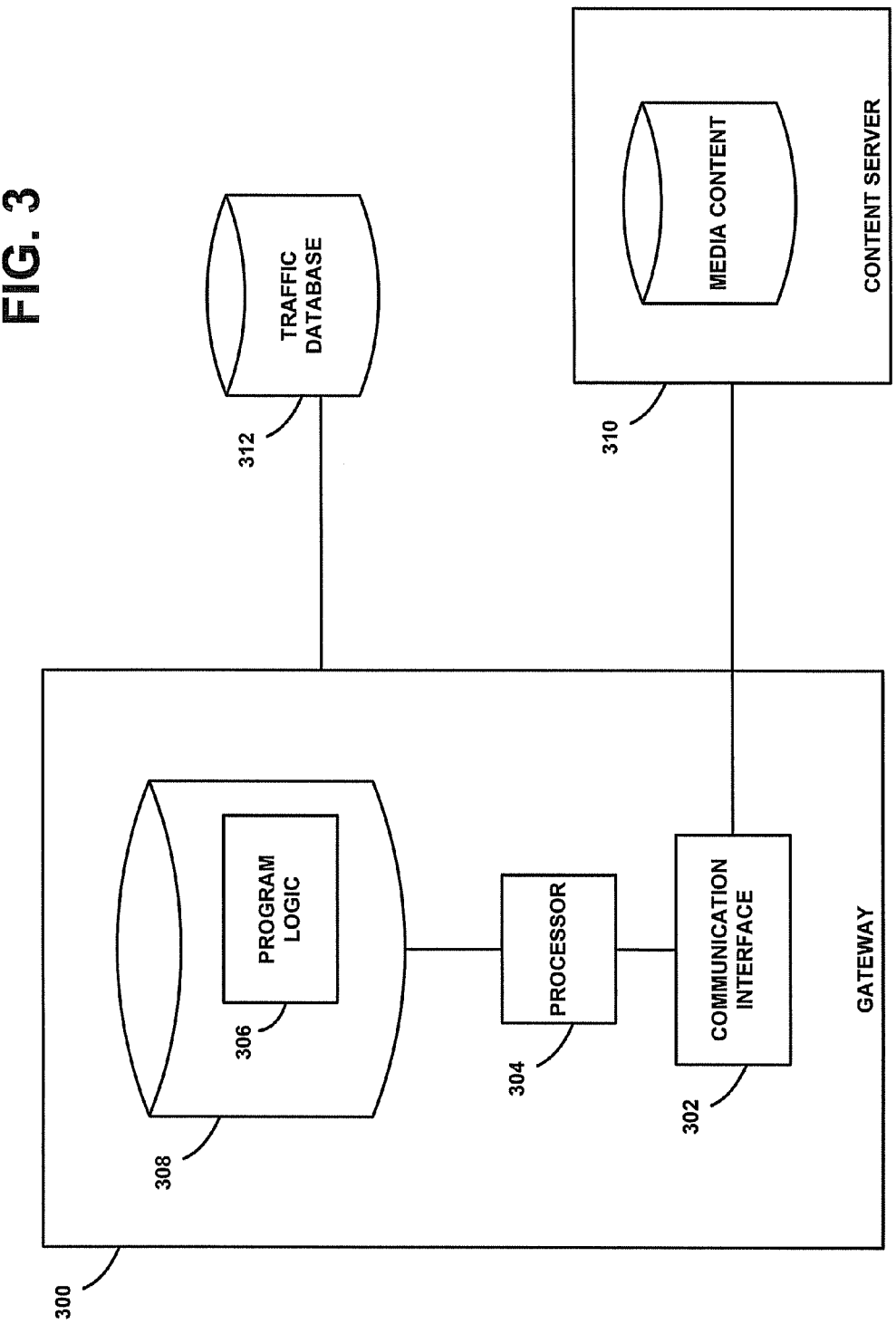
FIG. 3 is a block diagram illustrating a system configured to use an MCD file to manage media streams in a coverage area, according to an exemplary embodiment.

FIG. 3 is a block diagram illustrating a system 300 configured to use an MCD file to manage media streams in a coverage area, according to an exemplary embodiment. In an exemplary embodiment, the system takes the form of a gateway that is configured to manage requests for, and/or transmissions of, media content that is stored on a content server. It should be understood that the system, or portions thereof, may take on other forms, without departing from the scope of the invention. As illustrated, the system 300 comprises a communication interface 302, a processor 304, and program logic 306 stored in data storage 308. The program logic is executable by the processor 304 to provide the functionality of the system described herein and otherwise. The program logic may take the form of program code in any appropriate programming language, or may take any other appropriate form as is known in the art.

Communication interface 302 may provide packet-data connectivity to a packet data network such as the Internet, over which an access terminal, which is typically provided with packet-data connectivity through a wireless access network, may request media content. The communication interface 302 is configured to receive requests from access terminals to stream media content that is stored on content server 310. The communication interface 302 may further be configured to receive sector-identification data from each requesting access terminal, which identifies the sector in which the requesting access terminal is operating. The sector-identification data is typically is received in association with or as part of a request for a media stream.

In a further aspect, system 300 is configured to, upon receipt of each media-stream request, determine whether or not opening the media stream will cause traffic in the sector of the requesting access terminal to reach a threshold level. If the traffic in the sector has reached the threshold level, the system 300 modifies the MCD file to indicate a second format in which subsequent media streams are available.

The system 300 may further include or have access to a traffic database 312, which stores records of open media streams in each of one or more sectors of the wireless access network. In particular, the database 312 may indicate which media streams are open in which sectors. Accordingly, the system 300 may be configured to store a record of each requested media stream in the traffic database 312. Generally, the record may indicate that the media stream is open or is about to be opened in the sector in which the requesting access terminal is operating. After storing each record, the system may query the traffic database to determine how many open media streams exist in the requesting access terminal's sector, determine if the number of open media streams is above the threshold number for the sector, and then modify the MCD file if appropriate. Further, the system 300 may be configured to detect and update the database 312 when media streams are closed, In a further aspect, the traffic database 312 may be accessed and updated by multiple gateways, in order to provide a more complete picture of the traffic in various coverage areas (as it is possible that different access terminals in a common coverage area may request media streams via different gateways or systems). This configuration may be implemented to accommodate scenarios where multiple content servers and/or multiple gateways provide content in the same sector.

Figure 4:
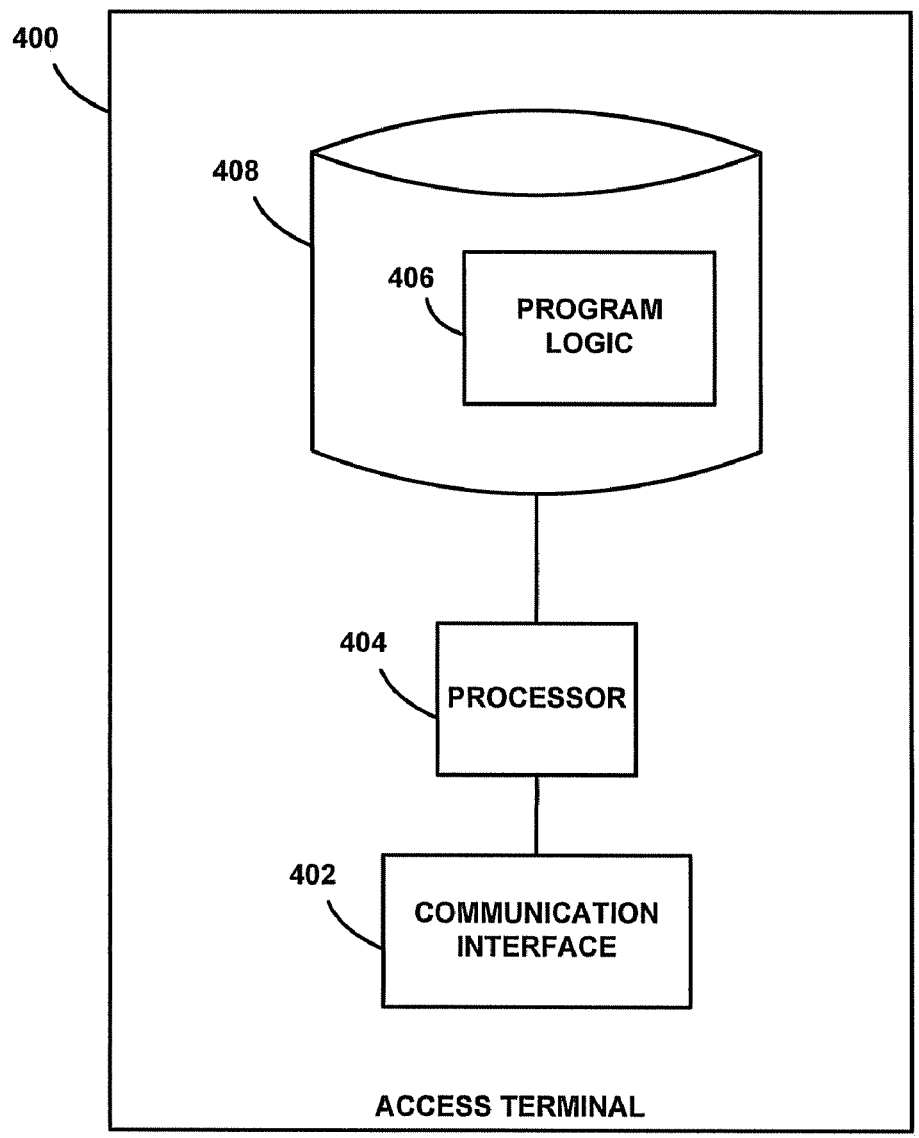
FIG. 4 is a block diagram illustrating an access terminal, according to an exemplary embodiment.

FIG. 4 is a block diagram illustrating an access terminal 400, according to an exemplary embodiment. The access terminal may include a communication interface 402, a processor 404, program logic 406 stored in data storage 408. The access terminal may also include speakers (not shown), and/or a display (not shown) for playback of media content. In an exemplary embodiment, access terminal 400 uses communication interface 402 to engage in packet-data communications with an access network. The program logic 406 is executable by the processor 404, and may be executable to provide functionality of the system described herein and otherwise. The program logic 406 may take the form of program code in any appropriate programming language, or may take any other appropriate form as is known in the art.

More specifically, while it is located in a given sector, the access terminal 400 may be configured to receive a Media Channel Descriptor (MCD) file, which indicates a format or formats in which media content is available from a content server (preferably via a gateway). Accordingly, the access terminal 400 may request a media stream (of the available media content) from the content server. The access terminal 400 may then engage in a streaming media session and receive the requested media stream.

Further, in association with each media-stream request it sends, the access terminal 400 may send sector-identification data to the server. The sector-identification data identifies the sector in which the access terminal is operating, thus allowing the server to use the sector-identification data to determine traffic level in the sector in which the access terminal is operating relative to a threshold level, and responsively modify the MCD file according to the relative traffic level in the sector.

In another aspect, the access terminal 400 is configured to send the gateway traffic data, which is indicative of the current traffic in its coverage area, in conjunction with the media-stream request. As described, the traffic data provides information that the server uses in determining whether, after providing the requested media stream, the traffic in the coverage area has reached a threshold level, and responsively modifying the MCD file to indicate a second format in which new media streams are available, rather than the first format.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method for using a Media Channel Descriptor (MCD) file to manage available media content, wherein the MCD file comprises an indication of a format in which new media streams are available, and wherein the MCD file initially indicates a first format for new media streams, the method comprising:
  receiving one or more requests for a media stream, wherein each request for a media stream is received from an access terminal that is operating in a sector of a wireless access network;
  storing a record of each request for a media stream in a traffic database, wherein the record comprises an indication that a media stream is open or is about to be opened in the sector in which the requesting access terminal is operating; and
  upon receipt of each request for a media stream:
    making a determination as to whether or not, with initiation of the requested media steam to the access terminal, traffic in the sector in which the requesting access terminal is operating has reached a threshold level, wherein making the determination as to whether or not the traffic in the sector has reached the threshold level comprises: (a) after storing each record, querying the traffic database to determine a number of open media streams in the sector in which the requesting access terminal is operating and (b) making a determination as to whether or not a number of open media streams in the sector is greater than or equal to a threshold number of media streams;
    if the determination is that the traffic has reached the threshold level, modifying the MCD file to indicate a second format for new media streams and to not indicate the first format for new media streams; and
    if the determination is that the traffic has not reached the threshold level, refraining from modifying the MCD file.

2. The method of claim 1, further comprising:
  receiving sector-identification data from each requesting access terminal, wherein the sector-identification data identifies the sector in which the requesting access terminal is operating; and
  using the sector-identification data as a basis for making the determination as to whether or not, with the initiation of the requested media steam to the access terminal, traffic in the sector in which the requesting access terminal is operating has reached a threshold level.

3. The method of claim 2, wherein the sector-identification data is received from the access terminal as part of or in association with the request for media content.

4. The method of claim 1 further comprising:
  if the determination is that the number of open media streams in the sector in which the requesting access terminal is operating is greater than or equal to the threshold number, then modifying the MCD file to indicate the second format for new media streams.

5. The method of claim 1, further comprising, after modifying the MCD file to indicate the second format for new media streams:
- if the determination is that the number of open media streams in the sector in which the requesting access terminal is operating is less than the threshold number, then modifying the MCD file to indicate the first format for new media streams.

6. The method of claim 1, further comprising:
- after modifying the MCD file to indicate the second format, determining whether one or more media streams have closed; and
- if any media streams have been closed, updating the traffic database to reflect that the media streams are no longer open.

7. The method of claim 6, further comprising, after updating the traffic database to reflect that the media streams are no longer open:
- making a determination as to whether or not a number of open media streams in the sector in which the requesting access terminal is operating is greater than or equal to a threshold number of media streams;
- if the MCD file indicates the first format for new data streams, and the determination is that the number of open media streams in the sector in which the requesting access terminal is operating is greater than or equal to the threshold number, then modifying the MCD file to indicate the second format for new data streams; and
- if the MCD file indicates the second format for new data streams, and the determination is that the number of open media streams in the sector in which the requesting access terminal is operating is less than the threshold number, then modifying the MCD file to indicate the first format for new data streams.

8. The method of claim 1, further comprising after modifying the MCD file to indicate the second format, continuing existing media streams in a respective formats in which the existing media streams were initiated.

9. The method of claim 1, wherein the first format comprises an audiovisual format.

10. The method of claim 9, wherein the second format comprises an audiovisual format of lesser quality than the first format.

11. The method of claim 1, wherein the second format comprises an audio format.

12. A system configured to use a Media Channel Descriptor (MCD) file to manage available media content, wherein the MCD file indicates a format in which new media streams are available, and wherein the MCD file initially indicates a first format for new media streams, the system comprising:
- a communication interface configured to receive one or more requests for a media stream, wherein each request for a media stream is received from an access terminal that is operating in a sector of a wireless access network;
- a processor; and
- program logic stored in data storage and executable by the processor to:
  - store a record of each request for a media stream in a traffic database, wherein the record comprises an indication that a media stream is open or is about to be opened in the sector in which the requesting access terminal is operating;
  - upon receipt of each request for a media stream:
    - (a) after storing each record, query the traffic database to determine a number of open media streams in the sector in which the requesting access terminal is operating;
    - (b) make a determination as to whether or not, with initiation of the requested media steam to the access terminal, traffic in the sector in which the requesting access terminal is operating has reached a threshold level, wherein the determination as to whether or not the traffic in the sector has reached the threshold level comprises a determination as to whether or not a number of open media streams in the sector is greater than or equal to a threshold number of media streams;
    - (c) if the determination is that the traffic has reached the threshold level, then modify the MCD file to indicate a second format for new media streams and to not indicate the first format for new media streams; and
    - (d) if the determination is that the traffic has not reached the threshold level, then refrain from modifying the MCD file.

13. The system of claim 12:
- wherein the communication interface is further configured to receive sector-identification data from each requesting access terminal, wherein the sector-identification data identifies the sector in which the requesting access terminal is operating; and
- wherein the program logic stored in the data storage is further executable to use the sector-identification data as a basis for the determination as to whether or not, with the initiation of the requested media steam to the access terminal, traffic in the sector in which the requesting access terminal is operating has reached the threshold level.

14. The system of claim 13, wherein the sector-identification data is received from the access terminal as part of or in association with the request for media content.

15. The system of claim 12, further comprising a traffic database for maintaining records of open media streams in each of one or more sectors of the wireless access network.

16. The system of claim 12, wherein the system takes the form of a gateway that provides access to media content stored on a content server.

* * * * *